(12) United States Patent
Kapadia et al.

(10) Patent No.: US 9,565,105 B2
(45) Date of Patent: Feb. 7, 2017

(54) IMPLEMENTATION OF VIRTUAL EXTENSIBLE LOCAL AREA NETWORK (VXLAN) IN TOP-OF-RACK SWITCHES IN A NETWORK ENVIRONMENT

(71) Applicant: CISCO TECHNOLOGY, INC., San Jose, CA (US)

(72) Inventors: Shyam Kapadia, Santa Clara, CA (US); Puto H. Subagio, Cupertino, CA (US); Yibin Yang, San Jose, CA (US); Nilesh Shah, Fremont, CA (US); Vipin Jain, San Jose, CA (US); Ashutosh Agrawal, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 362 days.

(21) Appl. No.: 14/018,134

(22) Filed: Sep. 4, 2013

(65) Prior Publication Data

US 2015/0063353 A1    Mar. 5, 2015

(51) Int. Cl.
*H04L 12/741* (2013.01)
*H04L 12/56* (2006.01)

(52) U.S. Cl.
CPC ........... *H04L 45/745* (2013.01); *H04L 45/741* (2013.01)

(58) Field of Classification Search
None
See application file for complete search history.

(56) References Cited

U.S. PATENT DOCUMENTS

| | | | |
|---|---|---|---|
| 2003/0152092 A1* | 8/2003 | Lu | H04L 29/12009 370/408 |
| 2009/0180489 A1* | 7/2009 | Fujita et al. | 370/409 |
| 2013/0124750 A1* | 5/2013 | Anumala et al. | 709/232 |
| 2013/0322453 A1* | 12/2013 | Allan | H04L 12/4662 370/395.53 |
| 2014/0092907 A1* | 4/2014 | Sridhar | H04L 45/74 370/392 |
| 2014/0348006 A1* | 11/2014 | Jain et al. | 370/245 |

(Continued)

OTHER PUBLICATIONS

Mahalingam et al., "VXLAN: A Framework for Overlaying Virtualized Layer 2 Networks over Layer 3 Networks," Network Working Group, Internet Engineering Task Force Draft, Aug. 22, 2012, 21 pages; http://tools.ietf.org/html/draft-mahalingam-dutt-dcops-vxlan-02.

*Primary Examiner* — Yemane Mesfin
*Assistant Examiner* — Peter Chen
(74) *Attorney, Agent, or Firm* — Patent Capital Group (57) ABSTRACT

An example method for implementation of virtual extensible local area network (VXLAN) in top-of-rack (ToR) switches in a network environment is provided and includes receiving a packet encapsulated with a VXLAN header having an unknown virtual tunnel endpoint (VTEP) Internet Protocol (IP) address in a network environment, and installing an entry at an index location of a forwarding table. The index location includes an encoding of the VTEP-IP address as a VTEP index (VTEP-IDX), and the entry maps a VXLAN interface to an IP address associated with a VXLAN network identifier (VNI). In specific embodiments, the VTEP-IDX is log N bits, where N is a size of the forwarding table. The forwarding table indicates a destination VTEP IP address when encapsulating the packet, and the source VTEP IP address when decapsulating the packet.

20 Claims, 6 Drawing Sheets

(56) References Cited

U.S. PATENT DOCUMENTS

2015/0009992 A1* 1/2015 Zhang ............................ 370/392
2015/0049765 A1* 2/2015 Tatsumi ........................ 370/401
2015/0058470 A1* 2/2015 Duda ............................ 709/224

* cited by examiner

IMPLEMENTATION OF VIRTUAL EXTENSIBLE LOCAL AREA NETWORK (VXLAN) IN TOP-OF-RACK SWITCHES IN A NETWORK ENVIRONMENT

TECHNICAL FIELD

This disclosure relates in general to the field of communications and, more particularly, to implementation of virtual extensible local area network (VXLAN) in top-of-rack (ToR) switches in a network environment.

BACKGROUND

Data centers are increasingly used by enterprises for collaboration and for storing data and/or resources. A typical data center network contains myriad network elements, including hosts, load-balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for implementation of VXLAN in ToR switches in a network environment is provided and includes receiving a packet encapsulated with a VXLAN header having an unknown virtual tunnel endpoint (VTEP) Internet Protocol (IP) address in a network environment, and installing (e.g., writing, preparing for use, setting up, etc.) an entry at an index location of a forwarding table. The index location includes an encoding (e.g., converting, translating, associating, etc.) of the VTEP-IP address as a VTEP index (VTEP-IDX), and the entry maps a VXLAN interface to an IP address associated with a VXLAN network identifier (VNI). In specific embodiments, the VTEP-IDX is log N bits, where N is a size of the forwarding table. The IP address indicates a destination IP address when encapsulating the packet, and a source IP address when decapsulating the packet.

Example Embodiments

Figure 1:
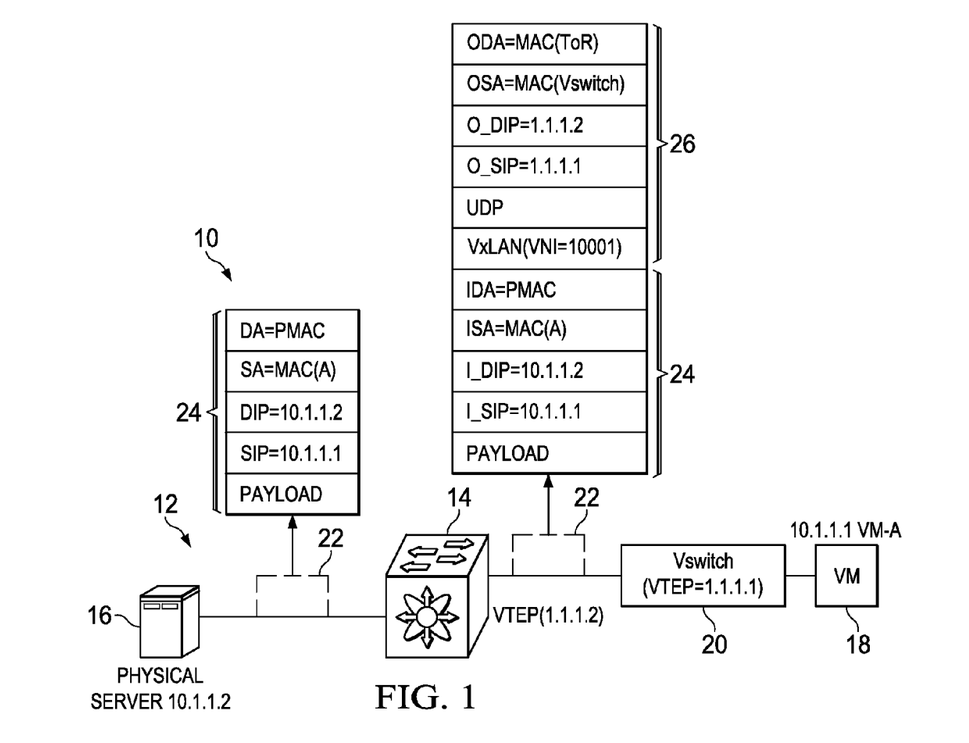
FIG. 1 is a simplified block diagram illustrating a communication system to facilitate implementation of VXLAN in ToR switches in a network environment according to an example embodiment.

Turning to FIG. 1, FIG. 1 is a simplified block diagram illustrating an embodiment of communication system 10 for facilitating implementation of VXLAN in ToR switches in a network environment. Communication system 10 includes a network 12 comprising devices enabled with VXLAN protocols that can communicate with each other and with non-VXLAN devices (e.g., devices that are not enabled with VXLAN protocols) through a ToR switch 14. In various embodiments, ToR switch 14 may function as a VXLAN gateway, forwarding traffic between VXLAN and non-VXLAN environments.

As used herein, the term "ToR switch" comprises a network element configured to forward packets (e.g., a packet is a formatted unit of data carried in a communication or computer network and can include Layer 3 packets and/or Layer 2 Ethernet frames) in a network environment. A network element encompasses computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In various embodiments, ToR switch 14 can include software or hardware with one or more interfaces to enable forwarding traffic between VXLAN enabled devices and non-VXLAN devices in network 12.

VXLAN refers to an encapsulation protocol for running an overlay network on existing Layer 3 infrastructure. The term VXLAN as used herein includes the protocol according to Internet-Draft titled "VXLAN: A Framework for Overlaying Virtualized Layer 2 Networks over Layer 3 Networks" submitted with the Internet Engineering Task Force (IETF) and variations, updates, and revisions thereof, and Network Virtualization using Generic Routing Encapsulation (NVGRE) according to Internet Draft titled "NVGRE: Network Virtualization using Generic Routing Encapsulation" submitted with the IETF and variations, updates and revisions thereof. For example, non-VXLAN devices include devices that are not enabled with either VXLAN or NVGRE; VXLAN enabled devices include devices that are enabled with either VXLAN or NVGRE, or both.

Non-VXLAN devices can include, by way of examples, and not limitations, one or more servers 16 (e.g., physical or virtual servers). VXLAN enabled devices can include, by way of example, and not as a limitation, a virtual machine (VM) 18. Physical server 16 in a non-VXLAN environment may communicate with VM 18 in a VXLAN environment through ToR switch 14, which can function as the VXLAN gateway. VM 18 may be connected to network 12 through a virtual switch (vSwitch) 20 in some embodiments.

Various embodiments provide for a highly scalable implementation of VXLAN in ToR switches that removes the burden of software and hardware handling of a peer identification (peerID) for virtual tunnel end-points (VTEPs) and allows both VXLAN encapsulation and decapsulation processes to share a common table for deriving a source and destination VTEP Internet Protocol (IP) addresses for learning and forwarding, respectively. In some embodiments, a VTEP-IP address (e.g., either /32 and /128 addresses) can be represented with log N bits for a common table of size N, allowing savings of at least 1:2 and 1:8 with IPv4 and IPv6 addresses, respectively for N less than or equal to 64K.

Packet 22 may include inner header 24 (also referred to as an original header), to which outer header 26 (also referred to as a VXLAN header) may be added during VXLAN encapsulation. As used herein, the term "inner header" comprises a portion of an Ethernet frame that includes source and destination media access control addresses (MACs) and source and destination IP addresses corresponding to the network element that originates the Ethernet frame. The term "outer header" or interchangeably, "VXLAN header" comprises a portion of an encapsulation of the Ethernet frame according to VXLAN protocols, wherein the outer header can comprise MAC addresses, IP addresses, and VXLAN parameters (such as VXLAN network identifier (VNI)) associated with the VTEP that encapsulates the Ethernet frame.

Inner header 24 may include a destination address (DA), referred to as Inner DA (IDA) in a VXLAN encapsulated format, a source address (SA), referred to as Inner SA (ISA) in the VXLAN encapsulated format, a destination IP address (DIP), referred to as Inner DIP (I_DIP) in the VXLAN encapsulated format, and a source IP address (SIP), referred to as Inner SIP (I_SIP) in the VXLAN encapsulated format. Packet 22 may also include a payload carrying communication data. Outer header 26 may include a outer destination address (ODA); an outer source address (OSA), an outer destination IP address (O_DIP), an outer source IP address (O_SIP), User datagram protocol (UDP) port number; and a VNI.

When packet 22 is sent from VM 18 to physical server 16, IDA may include a Media Access Control (MAC) address of server 16; ISA may include a MAC address of VM 18; I_DIP may include an IP address of server 16 (e.g., 10.1.1.2); and I_SIP may include an IP address of VM 18 (e.g., 10.1.1.1). vSwitch 20 may perform VXLAN encapsulation of packet 22, wherein ODA may include a MAC address of ToR switch 14; OSA may include an IP address of vSwitch 20 (e.g., 1.1.1.1); and VNI may include an appropriate reference identifier for the specific VNI of VM 18 (e.g., 10001). ToR switch 14 may strip outer header 26 from packet 22 and forward it to server 16 in the non-VXLAN environment.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

VLANs according to IEEE 802.1Q standard have been the traditional mechanism for providing logical network isolation. The IEEE 802.1Q standard specifies a 12-bit VLAN identifier (ID), which limits the scalability of cloud networks beyond 4K VLANs. VXLAN can overcome the scalability limitation of VLANs with a MAC in User Datagram Protocol (MAC-in-UDP) encapsulation technique and a 24-bit segment identifier in the form of a VXLAN Segment ID, also referred to as VNI. VXLAN creates Layer 2 logical networks encapsulated in standard Layer 3 IP packets. The VNI in every frame differentiates the VXLAN logical networks from each other without any VLAN tags, allowing large numbers of isolated Layer 2 VXLAN networks to co-exist on a common Layer 3 infrastructure. For example, VXLAN allows a number of bridge-domain or L2 VLANs to be increased from 4k to 16 million.

VXLAN is a method for "floating" virtual domains on top of a common networking and virtualization infrastructure. VXLAN provides the capability to create isolated, multi-tenant broadcast domains across data centers and enables creation of elastic, logical networks that span physical network boundaries. VXLAN leverages existing Ethernet technology enabling large numbers of virtual domains to be created above the Layer 3 network infrastructure, with isolation from each other and the underlying network. VXLAN offers several benefits, for example, flexibility, streamlined network operations, and investment protection. Datacenter server and storage utilization and flexibility can be maximized through support of VXLANs that cross switching and pod boundaries. VXLAN runs on standard Layer 3 IP networks, eliminating the need to build and manage a large Layer 2 underlying transport layer. VXLAN runs over standard switching hardware, with no need for software upgrades or special code versions on the switches.

VXLAN is essentially a tunneling technique, and a gateway is required to translate VNIs to VLAN IDs so that non-VXLAN devices can communicate with VXLAN enabled devices. The gateway connects VXLAN enabled devices on one interface with non-VXLAN devices on another interface. The gateway functionality could be implemented in software or hardware. For incoming frames on the VXLAN connected interface, the gateway strips out the VXLAN outer header and forwards to a physical port based on the destination MAC address of the inner header in the Ethernet frame. Decapsulated frames with the inner VLAN ID are discarded unless configured explicitly to be passed on to the non-VXLAN interface. In the reverse direction, incoming frames for the non-VXLAN interfaces are mapped to a specific VXLAN overlay network based on the VNI in the frame. Unless configured explicitly to be passed on in the encapsulated VXLAN frame, the VLAN ID is removed before the frame is encapsulated for VXLAN.

Typical implementations of the VXLAN gateway are software based, with the VXLAN gateway application executing on an appropriate hypervisor in a suitable network element. However, software implementations of the VXLAN gateway can lead to performance issues (e.g., lower speed), and hence, a hardware implementation, for example, on an application specific integrated circuit (ASIC) of a ToR switch may be desirable.

In VXLAN implementations, frame encapsulation is done by an entity known as a VXLAN Tunnel Endpoint (VTEP.) The VTEP has two logical interfaces: an uplink interface to a Bridge Domain (BD) and a downlink interface that provides an IP interface to the IP network. The uplink interface is responsible for receiving VXLAN frames and acts as a tunnel endpoint with an IP address used for routing VXLAN encapsulated frames. The BD is associated with a VXLAN ID (also called Segment ID, or VNI), and in turn, each VNI is associated with an IP multicast group. VTEP functionality can be implemented in software such as a virtual switch or in a physical switch. In typical implementations, the VTEPs connect an access switch (e.g., virtual switch) to the IP network. The VTEP is located within a hypervisor that executes the VMs. The VTEP encapsulates the VM traffic within the VXLAN header to send across the IP network.

In typical VM to VM unicast communication within the VXLAN environment, based on a configuration in the BD, VM traffic is assigned a specific VNI at the local VTEP. The VTEP then determines if the destination VM is on the same segment. The VTEP encapsulates the original Ethernet frame with the VXLAN header. The complete packet is sent out to the IP network with the destination IP address of remote VTEP connected to the destination VM. The remote VTEP decapsulates the packet and forwards the frame to the connected VM. The remote VTEP also learns the inner SMAC and outer SIP addresses.

With VXLAN, learning is implemented along a data path (e.g., without control plane participation). VXLAN frames are sent to the IP address assigned to the destination VTEP; the destination VTEP-IP address is placed in the O_DIP field. The IP of the VTEP sending the frame resides in the O_SIP field. Packets received on the uplink are mapped from the VNI to a VLAN and the Ethernet frame payload is sent as an 802.1Q Ethernet frame on the downlink. During this process, the ISA and VNI are learned in (e.g., saved to, written to, etc.) a local table. Packets received on the downlink are mapped to a VNI using the VLAN of the frame. A lookup is then performed within the VTEP L2 table using the VNI and destination MAC; this lookup provides the IP address of the destination VTEP. The frame is then encapsulated and sent out the uplink interface.

Typically, an incoming packet with a VXLAN header that has a new source IP address, SIP, (indicating a new remote VTEP IP) is punted to a processor. Appropriate software executing in the processor allocates an appropriate peer identifier (peerID) for the new VTEP and installs a decapsulation entry in hardware. Hardware MAC learning for subsequent packets is based on an association between the VNI (mapped to the BD) and MAC address and the peerID (e.g., (VNI→BD, MAC)→peerID). In addition, packets destined toward the MAC are suitably encapsulated with the appropriate VXLAN header before they are sent out toward the destination. Therefore, the software also installs appropriate entries in a rewrite table such that the peerID driven by a L2 table lookup indicates the appropriate destination VTEP-IP address to be written in the O_DIP field of the outer header. Such a traditional approach requires software to perform the laborious task of keeping track of the peerIDs. Moreover, information about the remote VTEP is duplicated in the L2 table for decapsulation and the rewrite table for encapsulation.

Communication system 10 is configured to address these issues (and others) in offering a system and method for implementing VXLAN in ToR switches in a network environment. According to embodiments of communication system 10, ToR switch 14 may receive packet 22 having a VXLAN header with a hereto unknown VTEP-IP address. ToR switch 14 may encode the VTEP-IP address as an index named VTEP index (VTEP-IDX). The VTEP-IDX can serve as a unique identifier of the source VTEP (e.g., network element that generates the VXLAN header) having the VTEP-IP address. (VNI→BD, SMAC) may be learnt in a Layer 2 table against the VTEP-IDX, which can identify the remote VTEP that sourced/sent the packet. ToR switch 14 may install an entry at an index location corresponding to VTEP-IDX in a forwarding table, also called the VTEP table, located in a memory element (e.g., Application Specific Integrated Circuit (ASIC)) of ToR switch 14. As used herein, the term "forwarding table" includes any suitable data storage mechanism, including tables, arrays, pointers, etc. The entry may comprise a mapping between a combination of the VNI and an IP address associated with the VNI (e.g., SIP in inner header 24) to a VXLAN interface (e.g., BD). In various embodiments, ToR switch 14 may also perform Layer 2 hardware learning of (BD, SMAC) against the VTEP-IDX corresponding to the remote VTEP.

In some embodiments, ToR switch 14 may receive a native packet from a non-VXLAN enabled device. ToR switch 14 may perform a lookup of the Layer 2 table to obtain the VTEP-IDX, decode the VTEP-IDX to obtain the VTEP-IP address, and encapsulate the native packet with an appropriate VXLAN header, comprising the VTEP-IP address in an appropriate field (e.g., O_DIP) of the VXLAN header. Hence, the IP address associated with the VNI in the VTEP table can indicate a DIP when encapsulating the packet, and the SIP when decapsulating the packet. VNI being a VXLAN identifier that maps to a BD, may be used for Layer 2 lookup and Layer 2 learning. The SIP and DIP correspond to the VTEPs for learning and forwarding respectively and they may not be qualified by the VNI.

In many embodiments, the size of VTEP-IDX may be log N-bits where N is the size of the forwarding table (e.g., VTEP table) associating the VNI (and SIP corresponding to a source of the packet) with the source VTEP. In a specific example, the VTEP-IP address may be a 32 bit IPv4 address and the corresponding VTEP-IDX encoding the VTEP-IP address may be 14 bits (e.g., for N=16k). In another specific example, the VTEP-IP address may be a 128 bit IPv6 address and the corresponding VTEP-IDX encoding the VTEP-IP address may be 14 bits. The forwarding table (e.g., VTEP table) may be installed in hardware, for example, in an ASIC on ToR switch 14.

Embodiments of communication system 10 can independently lookup the SIP and DIP and then merge the result of the lookups. When a VXLAN packet with a new VTEP SIP is punted to software, software may install an appropriate tunnel decapsulation entry in hardware, typically (VNI, SIP/DIP) in the VTEP table. (When packet 22 is generated and sent by the VXLAN enabled device to the non-VXLAN enabled device, the SIP is installed in the VTEP table, which may be employed for forwarding lookup for traffic in the reverse direction) However, peerID allocation may not be performed. Instead, VTEP-IDX in the VTEP table where the (VNI, SIP/DIP) entry is installed can serve as a unique identifier of the source VTEP IP. The VTEP-IDX can also be used to learn (VNI, MAC) association. When packets are to be sent out toward the MAC, the L2 lookup may search for the VTEP-IDX in the VTEP table to facilitate VXLAN encapsulation.

In some embodiments, during encapsulation, the VTEP-IDX may be looked up in the VTEP table to obtain the appropriate IP that corresponding to O_DIP. In this manner, for a VTEP table of size N, merely log N bits may be required to encode information about the VTEP-IP addresses. The savings can be enormous, for example, in the case of IPv6 addresses. Moreover, a common VTEP table can serve a dual-purpose of deriving a peerID from SIP decapsulation lookup and generating O_DIP for encap. For example, assume that current decapsulation table size is 4K-32K, and peerID used is 12-15 bits. By using a single VTEP table, the savings would be 4K-32K times 12-15 bits as there is a single place where the VTEP information is maintained and used for both encapsulation and decapsulation purposes.

In some embodiments implementing a Transparent Interconnection of Lots of Links (TRILL) network architecture (or equivalents, like Cisco® FabricPath), an Rbridge Nickname may be localized and reused to represent the VTEP-IDX index. TRILL networks may include topologies comprising RBridges that are consistent with an Internet Engineering Task Force (IETF) standard as specified, for example, in Request for Comments (RFC) 6325 and associated standards. Identifiers in a 16 bit space used for the TRILL network may be separated from identifiers used to represent VTEPs (e.g., by user configuration). Appropriate tables may be used for mapping to and from the 16 bit ID at the network periphery. The scheme may be reused for other overlay encapsulations such as VPLS/NvGRE/VXLAN.

According to various embodiments, a separate peerID may not be needed, allocated, or managed by software. Hence, peerID bits may not be installed in the L2 table associated with decapsulation. The VTEP-IP information may be stored at one location, thereby allowing the same hardware table to be reused for both encapsulation and decapsulation. Hence, savings in terms of silicon space (and memory) can be achieved. For example, 32-bit IPv4/128-bit IPv6 VTEP-IP may be mapped to log N-bits where N is the size of VTEP table. Typically, N could be in the range 4K-32K, so the number of bits used for representing the VTEP-IDX is 12-15 bits. Consequently, the savings could be at least 1:2 and 1:8 with IPv4 and IPv6 respectively. Embodiments of communication system 10 can also achieve software and hardware scalability.

Turning to the infrastructure of communication system 10, the network topology can include any number of servers, service nodes, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Communication system 10 can include any number of servers, service nodes, virtual machines, gateways (and other network elements) within the broad scope of the embodiments.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, functionalities of ToR switch 14 may include VXLAN gateway functionalities, in addition to other VXLAN functionalities (e.g., encapsulation and decapsulation). In a general sense, ToR switch 14 may include any suitable switch that enables one or more servers and VMs to communicate in the network. In some embodiments, ToR switch 14 may connect various physical or virtual servers on a rack in a data center network. In various embodiments, ToR switch 14 may be configured with appropriate software and hardware to perform the operations described herein.

Figure 2:
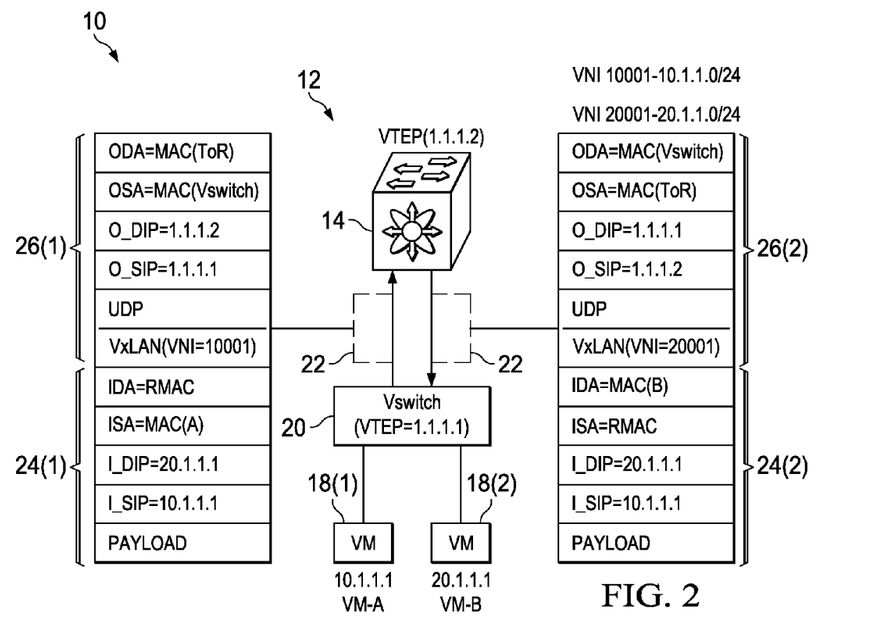
FIG. 2 is a simplified block diagram illustrating another example embodiment of the communication system.

Turning to FIG. 2, FIG. 2 is a simplified block diagram illustrating another embodiment of communication system 10. VM 18(1) in VNI 10.1.1.0/24 may communicate packet 22 with another VM 18(2) in another VNI 20.1.1.0/24 through vSwitch 20 and ToR switch 14 in network 12. Packet 22 may include inner header 24(1) and outer header 26(1) as it traverses from vSwitch 20, which acts as a source VTEP, to ToR switch 14, which acts as a destination VTEP. Inner header 24(1) may indicate an IDA corresponding to the router MAC address (RMAC); an ISA field including the MAC address of VM 18(1); an I_DIP field including 20.1.1.1, corresponding to the IP address of VM 18(2), and I_SIP field including the IP address of VM 18(1), namely 10.1.1.1. Outer header 24(1) may include an O_DA field including the MAC address of ToR switch 14; an OSA field including the MAC address of vSwitch 20; an O_DIP field including 1.1.1.2 corresponding to ToR switch 14, an O_SIP field including 1.1.1.1 corresponding to vSwitch 20, the UDP port, and the VNI indicating 10001 of VM 18(1).

ToR switch 14 may decapsulate packet 22, and install a mapping of a combination of VNI (e.g., 10001) and SIP (e.g., 10.1.1.1) to the BD in a VTEP table at an index location that encodes the VTEP-IP address of the source (e.g., 1.1.1.1). Hardware learning may also be performed, associating the MAC address of vSwitch 20 with the VNI (e.g., 10001) and VTEP-IDX. ToR switch 14 may then encapsulate packet 22 with outer header 26(2) and the source and destination MAC address in the inner header may also be rewritten to generate inner header 24(2).

Inner header 24(2) may indicate an IDA field including the MAC address of VM 18(2); an ISA field including RMAC; an I_DIP field including 20.1.1.1, corresponding to the IP address of VM 18(2), and I_SIP corresponding to the IP address of VM 18(1), namely 10.1.1.1. Outer header 24(2) may include an O_DA field including the MAC address of vSwitch 20; an OSA field including the MAC address of ToR switch 14; an O_SIP field including 1.1.1.2 corresponding to ToR switch 14, an O_DIP field including 1.1.1.1 corresponding to vSwitch 20, the UDP port, and the VNI indicating 20001 of VM 18(2). vSwitch 20, upon receiving packet 22 may decapsulate packet 22, and forward it appropriately to VM 18(2).

Figure 3:
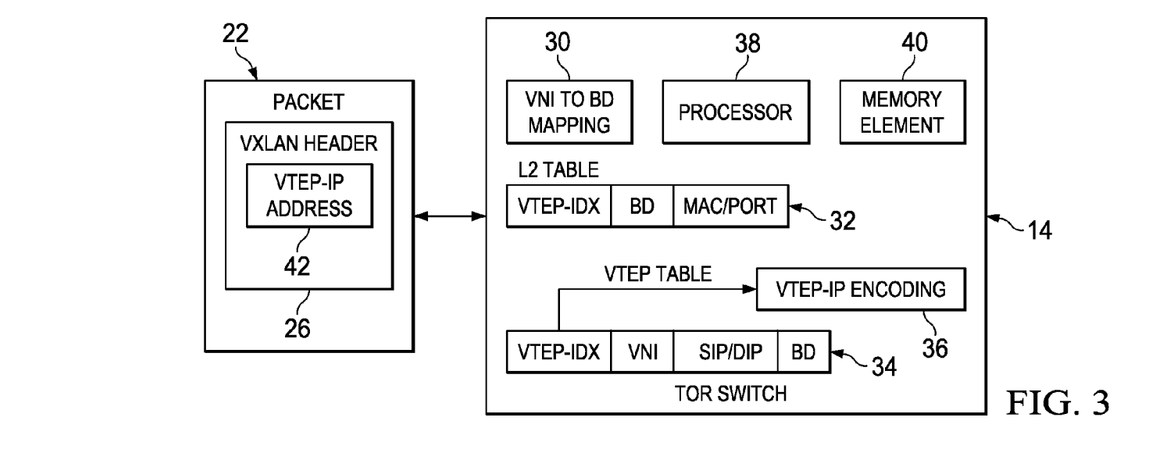
FIG. 3 is a simplified block diagram illustrating example details of an embodiment of the communication system.

Turning to FIG. 3, FIG. 3 is a simplified block diagram illustrating example details of embodiments of communication system 10. Example ToR switch 14 may include a VNI to BD mapping 30, an L2 table 32, a VTEP table 34 (also called forwarding table 34), a VTEP-IP encoding 36, a processor 38, and a memory element 40. In various embodiments, L2 table 32, VTEP table 34 and other data or instruction storing elements (e.g., VNI to BD mapping 30; VTEP-IP encoding 36) can include any suitable data storage mechanism, including ternary content addressable memory (TCAM) and variants thereof, databases, arrays, etc.

According to various embodiments, when packet 22 having VXLAN header 26 including (a hitherto unknown) VTEP-IP address 42 is received at ToR switch 14, VTEP table 34 may be populated with a new entry at location VTEP-IDX corresponding to an encoding of VTEP-IP address 42. In some embodiments, the encoding algorithm (e.g., direct one-to-one mapping e.g., a table; a hash algorithm; etc.) may be accessed in VTEP-IP encoding 36. In some embodiments, VTEP-IDX may comprise a pointer to VTEP-IP address 42 written to (e.g., saved in) a table including VTEP-IP encoding 36. The new entry at VTEP-IDX in VTEP table 34 may include a mapping of a combination of VNI and SIP to BD (e.g., obtained from VNI to BD mapping 30). An L2 table 32 may be populated with an association between the BD and MAC/port corresponding to the VTEP-IDX (associated with VTEP-IP address 42).

When a native packet (e.g., without VXLAN header 26) is received at ToR switch 14, and destined to a VXLAN device, a lookup in L2 table 32 may indicate the VTEP-IDX behind which the destination MAC resides. The VTEP-IDX may indicate VTEP-IP address 42, which may be written to the appropriate field in VXLAN header 26 when encapsulating the native packet according to VXLAN protocols. Processor 38 and memory element 40 may facilitate the operations described herein. In various embodiments, VTEP table 34, L2 table 32 and VTEP-IP encoding 36 may be provided in memory element 40.

Figure 4:
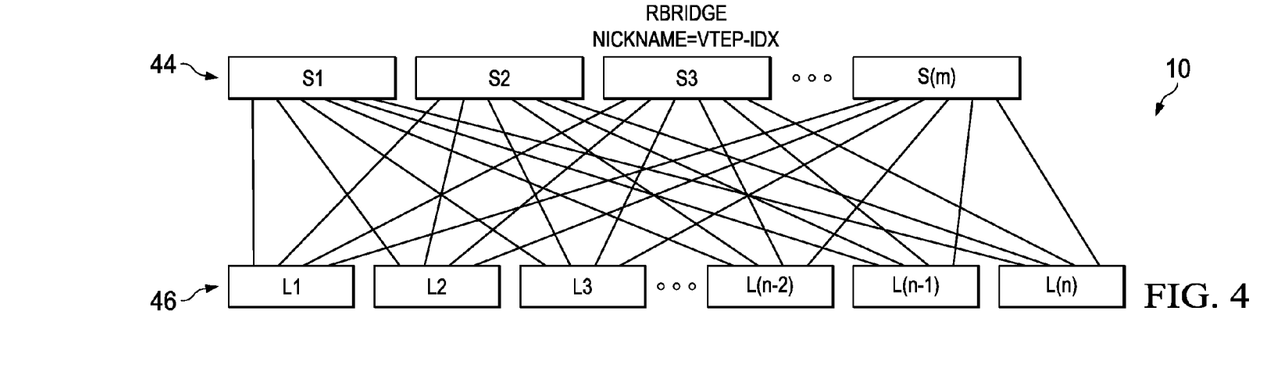
FIG. 4 is a simplified block diagram illustrating example details of an embodiment of the communication system.

Turning to FIG. 4, FIG. 4 is a simplified diagram illustrating an example network topology according to an embodiment of communication system 10. In TRILL networks, a plurality of spine switches 44 may be interconnected to a plurality of leaf switches 46. As used herein, the term "leaf switch" refers to a network element capable of forwarding communication traffic (e.g., data packets) from and to servers and other such data origination or data termination devices. The term "spine switch" refers to a network element capable of forwarding communication traffic between leaf switches.

In a VXLAN implementation of the TRILL network, an Rbridge Nickname (which can be 16 bits long) may be localized and reused to represent the VTEP-IDX. A separation of the IDs in the 16 bit space used for the TRILL network and IDs used to represent VTEPs may be provided through suitable mechanisms (e.g., by user configuration). Hence, existing forwarding pipelines may be reused by adding appropriate tables for mapping to and from the 16 bit ID at the periphery. Similar mechanisms may be also implemented in equivalent technologies, such as NVGRE and VPLS.

Figure 5:
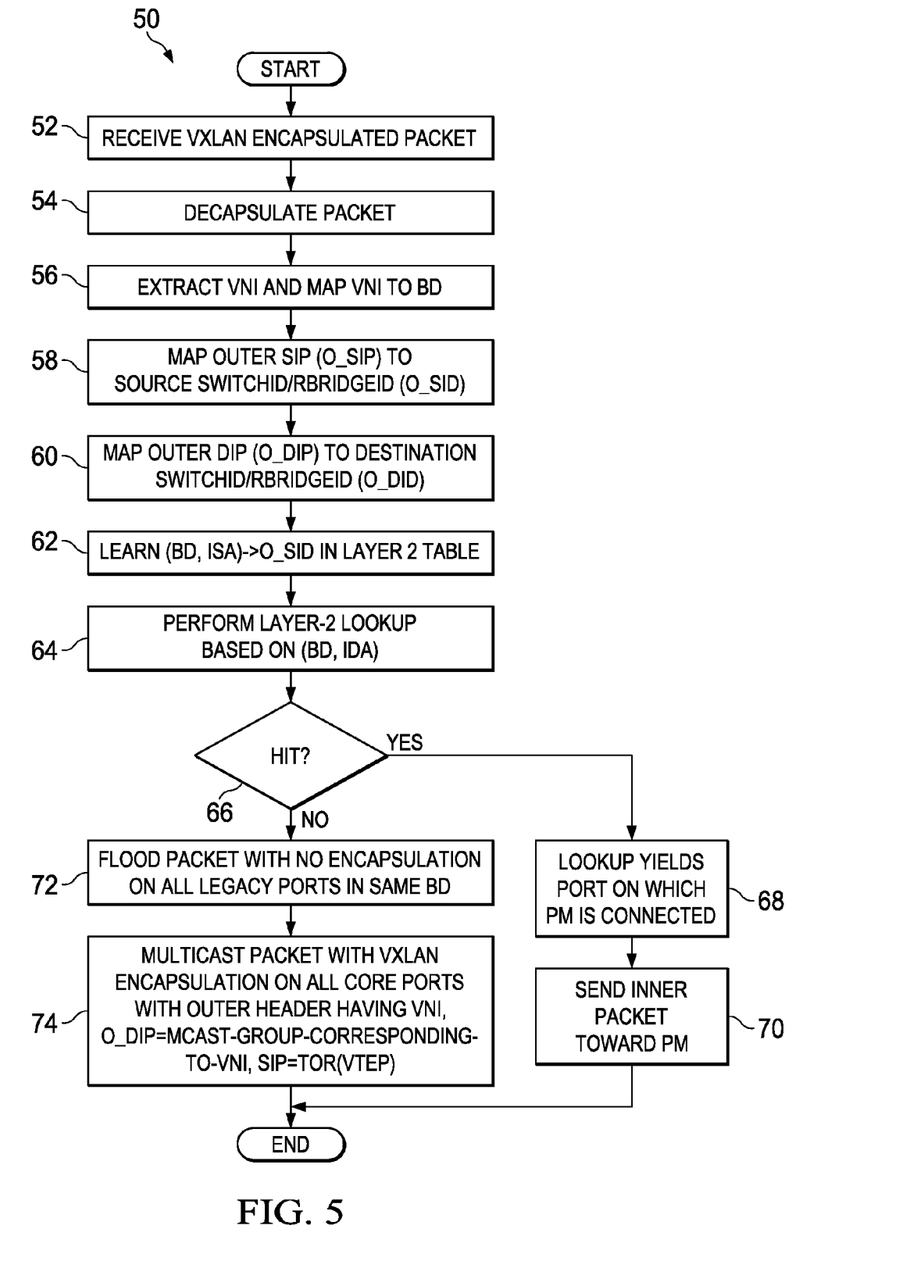
FIG. 5 is a simplified flow diagram illustrating potential example operations that may be associated with an embodiment the communication system.

Turning to FIG. 5, FIG. 5 is a simplified flow diagram illustrating example operations 50 that may be associated with traffic flow from a virtual machine (e.g., VM 18) to a physical machine (PM, e.g., server 16) in a TRILL network according to various embodiments. At 52, a VXLAN encapsulated packet (e.g., packet 22) may be received at ToR switch 14. At 54, ToR switch 14 may decapsulate the packet. At 56, VNI to BD mapping 30 in ToR switch 14 may extract the VNI and map VNI to BD. At 58, contents of the O_SIP field may be mapped to a source switchID or RBridgeID (e.g., O_SID field). In various embodiments, the RBridgeID or switchID may correspond to VTEP-IDX. At 60, contents of the O_DIP field may be mapped to a destination switchID or RBridgeID (e.g., O_DID field). At 62, an association between (BD, ISA) to O_SID (e.g., (BD,ISA)→O_SID) may be learnt in Layer 2 (L2) table 32. At 64, a Layer 2 lookup may be performed based on the combination of BD and IDA. At 66, a determination may be made whether a hit is returned in the lookup.

If a hit is returned, at 68, the lookup yields the port on which the PM (e.g., server 16) is connected. At 70, the inner packet may be sent towards the PM. If a hit is not returned, at 72, the packet may be flooded with no encapsulation on substantially all legacy ports in the same BD. At 74, the packet may be multicast with a VXLAN encapsulation on substantially all core ports with outer header (e.g., header 26) having VNI, O_DIP=MCAST-GROUP-CORRESPONDING-TO-VNI, SIP=TOR(VTEP).

Figure 6:
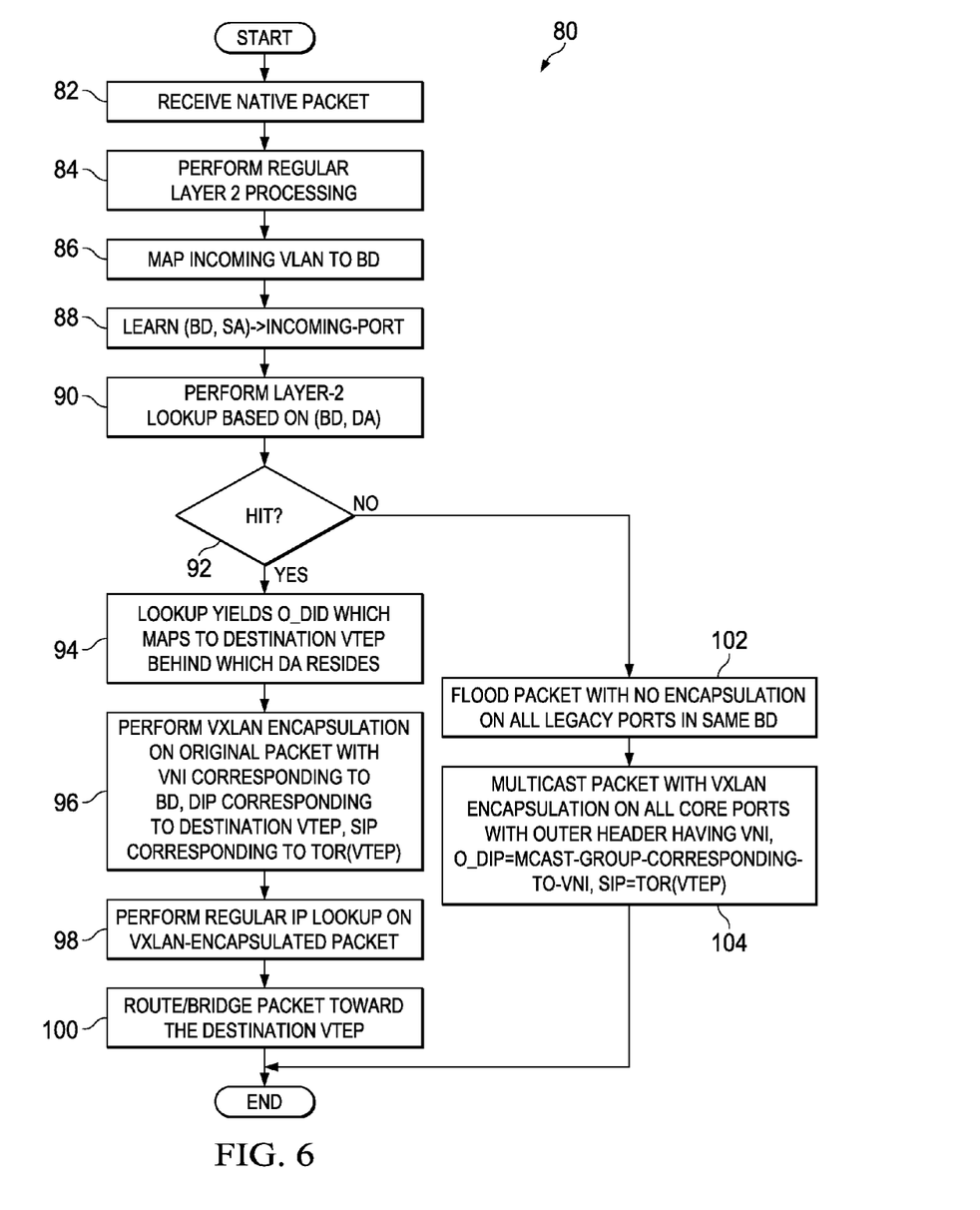
FIG. 6 is a simplified flow diagram illustrating other potential example operations that may be associated with an embodiment the communication system.

Turning to FIG. 6, FIG. 6 is a simplified flow diagram illustrating example operations 80 that may be associated with traffic flow from a physical machine (e.g., server 16) to a virtual machine (e.g., VM 18) in a TRILL network according to various embodiments. At 82, a native packet may be received at ToR switch 14 from the PM (e.g., server 16). At 84, ToR switch 14 may perform regular Layer 2 processing. At 86, the incoming VLAN may be mapped to the BD. At 88, learning of the combination of (BD, SA) associated with the incoming port may be performed. At 90, a layer 2 lookup based on the combination of (BD, DA) may be performed. At 92, a determination may be made whether a hit is returned.

At 94, if a hit is returned, the lookup yields the contents to be written to the O_DID field, which maps to the destination VTEP behind which the DA resides. At 96, VXLAN encapsulation may be performed on the original (native) packet with VNI corresponding to BD, DIP corresponding to the destination VTEP, and SIP corresponding to the VTEP-IP address of ToR switch 14. At 98, a regular IP lookup on the VXLAN encapsulated packet may be performed. At 100, the packet may be routed (or bridged, as appropriate) toward the destination VTEP. Turning back to 92, if a hit is not returned, at 102, the packet may be flooded with no encapsulation on substantially all legacy ports having the same BD. At 104, the packet may be multicast with a VXLAN encapsulation on substantially all core ports with outer header (e.g., header 26) having VNI, O_DIP=MCAST-GROUP-CORRESPONDING-TO-VNI, SIP=TOR(VTEP).

Figure 7:
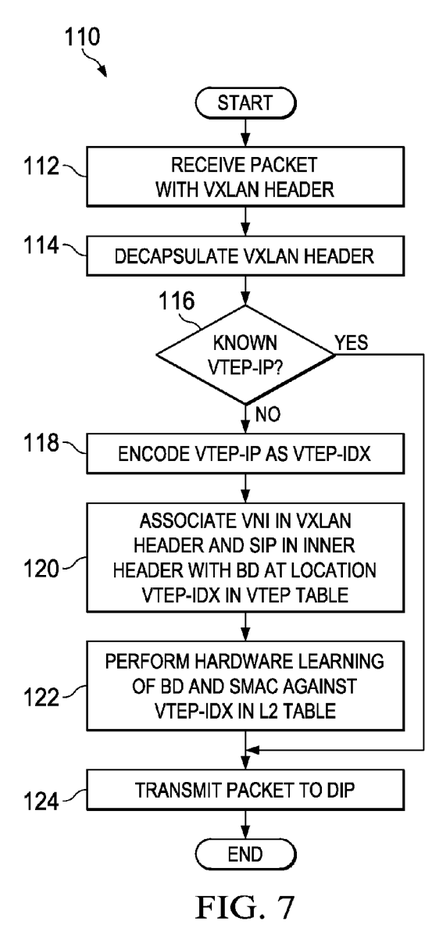
FIG. 7 is a simplified flow diagram illustrating yet other potential example operations that may be associated with an embodiment the communication system.

Turning to FIG. 7, FIG. 7 is a simplified flow diagram illustrating example operations 110 that may be associated with embodiments of communication system 10. At 112, packet 22 with VXLAN header 26 may be received at ToR switch 14. At 114, VXLAN header 26 may be decapsulated. At 116, a determination may be made whether VTEP-IP address 42 in VXLAN header 26 is known. If VTEP-IP address 42 is not known, at 118, VTEP-IP address 42 may be encoded as VTEP-IDX. At 120, the VNI in VXLAN header 26 and SIP in inner header 24 may be associated with the BD at location VTEP-IDX in VTEP table 34. At 122, hardware learning may be performed of BD and SMAC against the VTEP-IDX in L2 table 32. At 124, the packet may be transmitted to the DIP according to inner header 24.

Figure 8:
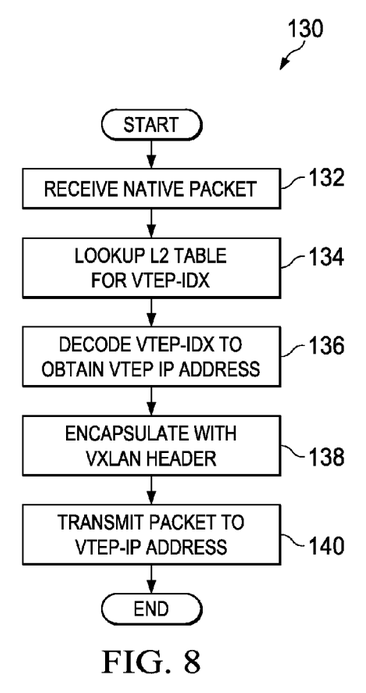
FIG. 8 is a simplified flow diagram illustrating yet other potential example operations that may be associated with an embodiment the communication system.

Turning to FIG. 8, FIG. 8 is a simplified flow diagram illustrating example operations 130 that may be associated with embodiments of communication system 10. At 132, a native packet may be received at ToR switch (e.g., from a non-VXLAN enabled device). At 134, L2 table 32 may be looked up for VTEP-IDX corresponding to the DMAC. At 136, the VTEP-IDX may be decoded to obtain VTEP-IP address 42. At 138, the packet may be encapsulated with VXLAN header 26. At 140, the packet may be transmitted to the network element associated with VTEP-IP address 42.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, ToR switch 14. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, ToR switch 14 described and shown herein (and/or the associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 40) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 38) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a Top-Of-Rack (ToR) switch, a packet encapsulated with a virtual extensible local area network (VXLAN) header from a virtual tunnel endpoint (VTEP) having an unknown VTEP-Internet Protocol (IP) address in a network environment;
   converting, by the ToR switch, the unknown VTEP-IP address to a smaller sized VTEP index (VTEP-IDX) serving as a unique identifier of the VTEP having the unknown VTEP-IP address; and
   installing an entry at an index location of a forwarding table, wherein the index location comprises the VTEP-IDX, wherein the entry maps a combination of a VXLAN network identifier (VNI) and an IP address indicated in an inner header of the packet to a bridge domain (BD) corresponding to a VXLAN interface, wherein the entry in the forwarding table is used by encapsulation and decapsulation processes at the ToR switch for deriving a destination VTEP IP address and source VTEP IP address of subsequent packets to and from the VTEP, respectively.

2. The method of claim 1, further comprising hardware learning of the VNI and a source Media Access Control address (SMAC) against the VTEP-IDX in a Layer 2 table.

3. The method of claim 2, further comprising:
   receiving, at the ToR switch, a native packet without any VXLAN header from a non-VXLAN enabled device;
   looking up the Layer 2 table to obtain the VTEP-IDX;
   decoding the VTEP-IDX to obtain the VTEP-IP address; and
   encapsulating the native packet with another VXLAN header, comprising writing the VTEP-IP address in an appropriate field of the another VXLAN header.

4. The method of claim 1, wherein the VTEP-IDX is log N bits, where N is a size of the forwarding table.

5. The method of claim 1, wherein the IP address indicates the destination VTEP IP address (DIP) when encapsulating the subsequent packets, and the source VTEP IP address (SIP) when decapsulating the subsequent packets.

6. The method of claim 1, wherein the VTEP-IP address is a 32 bit IPv4 address and the VTEP-IDX encoding the VTEP-IP address is 14 bits.

7. The method of claim 1, wherein the VTEP-IP address is a 128 bit IPv6 address and the VTEP-IDX encoding the VTEP-IP address is 14 bits.

8. The method of claim 1, wherein the forwarding table is located in a memory element of the ToR switch.

9. The method of claim 8, wherein the memory element comprises an Application Specific Integrated Circuit (ASIC) of the ToR switch.

10. The method of claim 8, wherein the ToR switch connects to a virtual machine through a virtual switch (vSwitch), wherein the ToR switch and the vSwitch function as VTEPs in the network environment.

11. Non-transitory media encoded in logic that includes instructions for execution that when executed by a processor of a Top-Of-Rack (ToR) switch, is operable to perform operations comprising:
    receiving, at the switch, a packet encapsulated with a virtual extensible local area network (VXLAN) header from a virtual tunnel endpoint (VTEP) having an unknown VTEP-Internet Protocol (IP) address in a network environment;
    converting, by the ToR switch, the unknown VTEP-IP address to a smaller sized VTEP index (VTEP-IDX) serving as a unique identifier of the VTEP having the unknown VTEP-IP address; and
    installing an entry at an index location of a forwarding table, wherein the index location comprises the VTEP-IDX, wherein the entry maps a combination of a VXLAN network identifier (VNI) and an IP address indicated in an inner header of the packet to a bridge domain (BD) corresponding to a VXLAN interface, wherein the entry in the forwarding table is used by encapsulation and decapsulation processes at the ToR switch for deriving a destination VTEP IP address and source VTEP IP address of subsequent packets to and from the VTEP, respectively.

12. The media of claim 11, wherein the operations further comprise hardware learning of the VXLAN interface and a source Media Access Control address (SMAC) against the VTEP-IDX in a Layer 2 table.

13. The media of claim 12, further comprising:
    receiving, at the ToR switch, a native packet without any VXLAN header from a non-VXLAN enabled device;
    looking up the Layer 2 table to obtain the VTEP-IDX;
    decoding the VTEP-IDX to obtain the VTEP-IP address; and
    encapsulating the native packet with another VXLAN header, comprising writing the VTEP-IP address in an appropriate field of the another VXLAN header.

14. The media of claim 11, wherein the VTEP-IDX is log N bits, where N is a size of the forwarding table.

15. The media of claim 11, wherein the IP address indicates the DIP when encapsulating the subsequent packets, and the SIP when decapsulating the subsequent packets.

16. An apparatus, comprising:
    a memory element for storing data; and
    a processor that executes instructions associated with the data, wherein the processor and the memory element cooperate such that the apparatus is configured for:
    receiving, at the apparatus, a packet encapsulated with a virtual extensible local area network (VXLAN) header from a virtual tunnel endpoint (VTEP) having an unknown VTEP-Internet Protocol (IP) address in a network environment, wherein the apparatus comprises a Top-Of-Rack (ToR) switch;
    converting, by the apparatus, the unknown VTEP-IP address to a smaller sized VTEP index (VTEP-IDX) serving as a unique identifier of the VTEP having the unknown VTEP-IP address; and
    installing an entry at an index location of a forwarding table, wherein the index location comprises the VTEP-IDX, wherein the entry maps a combination of a VXLAN network identifier (VNI) and an IP address indicated in an inner header of the packet to a bridge domain (BD) corresponding to a VXLAN interface, wherein the entry in the forwarding table is used by encapsulation and decapsulation processes at the ToR switch for deriving a destination VTEP IP address and source VTEP IP address of subsequent packets to and from the VTEP, respectively.

17. The apparatus of claim 16, further configured for hardware learning of the VXLAN interface and a source Media Access Control address (SMAC) against the VTEP-IDX in a Layer 2 table.

18. The apparatus of claim 17, further configured for:
receiving, at the apparatus a native packet without any VXLAN header from a non-VXLAN enabled device;
looking up the Layer 2 table to obtain the VTEP-IDX;
decoding the VTEP-IDX to obtain the VTEP-IP address; and
encapsulating the native packet with another VXLAN header, comprising writing the VTEP-IP address in an appropriate field of the another VXLAN header.

19. The apparatus of claim 16, wherein the VTEP-IDX is log N bits, where N is a size of the forwarding table.

20. The apparatus of claim 16, wherein the IP address indicates the DIP when encapsulating the subsequent packets, and the SIP when decapsulating the subsequent packets.

* * * * *